(12) United States Patent
Dasari et al.

(10) Patent No.: US 9,448,888 B2
(45) Date of Patent: Sep. 20, 2016

(54) PREVENTING A ROLLBACK ATTACK IN A COMPUTING SYSTEM THAT INCLUDES A PRIMARY MEMORY BANK AND A BACKUP MEMORY BANK

(71) Applicant: LENOVO ENTERPRISE SOLUTIONS (SINGAPORE) PTE. LTD., Singapore (SG)

(72) Inventors: Shiva R. Dasari, Austin, TX (US); Raghuswamyreddy Gundam, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 189 days.

(21) Appl. No.: 14/081,008

(22) Filed: Nov. 15, 2013

(65) Prior Publication Data
US 2015/0143163 A1    May 21, 2015

(51) Int. Cl.
*G06F 7/04* (2006.01)
*G06F 11/14* (2006.01)
*G06F 9/445* (2006.01)
(Continued)

(52) U.S. Cl.
CPC ....... *G06F 11/1417* (2013.01); *G06F 9/44505* (2013.01); *G06F 21/00* (2013.01); *G06F 21/575* (2013.01); *G06F 9/445* (2013.01); *G06F 2221/2141* (2013.01)

(58) Field of Classification Search
USPC ............................................. 726/16; 714/6.3
See application file for complete search history.

(56) References Cited

U.S. PATENT DOCUMENTS 5,825,880 A * 10/1998 Sudia ...................... G06F 21/40
380/286
7,907,729 B2    3/2011 Morrow et al.
(Continued)

FOREIGN PATENT DOCUMENTS

| CN | 1591363 A | 3/2005 |
| CN | 102238001 A | 11/2011 |
| EP | 1300765 A2 | 4/2003 |

OTHER PUBLICATIONS

Reynolds, J., et al., "On-Line Intrusion Detection and Attack Prevention Using Diversity, Generate-And-Test, and Generalization", Proceedings of the 36th Annual Hawaii International Conference (HICSS'03), Jan. 6-9, 2003, pp. 1-8, IEEE Computer Society Washington, DC, USA.

*Primary Examiner* — Amare F Tabor
(74) *Attorney, Agent, or Firm* — Brandon C. Kennedy; Katherine S. Brown; Kennedy Lenart Spraggins LLP (57) ABSTRACT

Preventing a rollback attack in a computing system that includes a primary memory bank and a backup memory bank, including during startup of the computing system: determining whether the computing system is attempting to use firmware in the backup memory bank; responsive to determining that the computing system is attempting to use firmware in the backup memory bank, determining whether the firmware in the backup memory bank is a previous version of firmware in the primary memory bank; responsive to determining that the firmware in the backup memory bank is a previous version of firmware in the primary memory bank, determining whether a system administrator has authorized the use of the firmware in the backup memory bank; and responsive to determining that the system administrator has authorized the use of the firmware in the backup memory bank, configuring the computing system to utilize the firmware in the backup memory bank.

15 Claims, 4 Drawing Sheets

(51) Int. Cl.
*G06F 21/00* (2013.01)
*G06F 21/57* (2013.01)

(56) References Cited

U.S. PATENT DOCUMENTS

| | | | |
|---|---|---|---|
| 8,041,988 B2 * | 10/2011 | Tarra et al. | 714/6.11 |
| 8,627,407 B1 * | 1/2014 | Satish | G06F 21/36 |
| | | | 709/229 |
| 2002/0013898 A1 * | 1/2002 | Sudia | G06Q 20/02 |
| | | | 713/155 |
| 2002/0152396 A1 | 10/2002 | Fox et al. | |
| 2003/0115469 A1 | 6/2003 | Shippy et al. | |
| 2005/0132351 A1 * | 6/2005 | Randall et al. | 717/168 |
| 2005/0188366 A1 * | 8/2005 | Chang | 717/168 |
| 2008/0047016 A1 * | 2/2008 | Spoonamore | G06F 21/577 |
| | | | 726/25 |
| 2008/0195868 A1 | 8/2008 | Asokan et al. | |
| 2009/0019551 A1 | 1/2009 | Haga et al. | |
| 2009/0217341 A1 * | 8/2009 | Sun et al. | 726/1 |
| 2009/0271603 A1 * | 10/2009 | Wang | 713/2 |
| 2011/0123024 A1 | 5/2011 | Morrow et al. | |
| 2013/0160084 A1 * | 6/2013 | Hansen | G06F 21/6227 |
| | | | 726/4 |
| 2014/0007071 A1 * | 1/2014 | Chang et al. | 717/170 |
| 2014/0130151 A1 * | 5/2014 | Krishnamurthy et al. | 726/22 |
| 2014/0282827 A1 * | 9/2014 | Mitchell | G06F 21/6218 |
| | | | 726/1 |
| 2014/0317612 A1 * | 10/2014 | Ayanam et al. | 717/171 |

* cited by examiner

PREVENTING A ROLLBACK ATTACK IN A COMPUTING SYSTEM THAT INCLUDES A PRIMARY MEMORY BANK AND A BACKUP MEMORY BANK

BACKGROUND OF THE INVENTION

1. Field of the Invention

The field of the invention is data processing, or, more specifically, methods, apparatus, and products for preventing a rollback attack in a computing system that includes a primary memory bank and a backup memory bank.

2. Description of Related Art

Modern computing systems may be subjected to attacks from a hacker, a malicious program, or another entity that is typically remote relative to the computing system. One form of such attacks is a rollback attack. A rollback attack is typically performed by updating to older level firmware/software with known vulnerabilities. Rollback attacks on firmware can be done by leveraging a backup bank feature that is supported in some servers and other computing devices. In server firmware implementations, a backup bank is typically used to keep a good copy of the code. This backup code is used, for example, for auto-recovery. If a system has older level of code in the backup bank, however, a rollback attack can occur by simply switching to the backup bank during startup of the system.

SUMMARY OF THE INVENTION

Methods, apparatuses, and products for preventing a rollback attack in a computing system that includes a primary memory bank and a backup memory bank, including during startup of the computing system: determining, by an attack prevention module, whether the computing system is attempting to use firmware in the backup memory bank; responsive to determining that the computing system is attempting to use firmware in the backup memory bank, determining, by the attack prevention module, whether the firmware in the backup memory bank is a previous version of firmware in the primary memory bank; responsive to determining that the firmware in the backup memory bank is a previous version of firmware in the primary memory bank, determining, by the attack prevention module, whether a system administrator has authorized the use of the firmware in the backup memory bank; and responsive to determining that the system administrator has authorized the use of the firmware in the backup memory bank, configuring, by the attack prevention module, the computing system to utilize the firmware in the backup memory bank.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
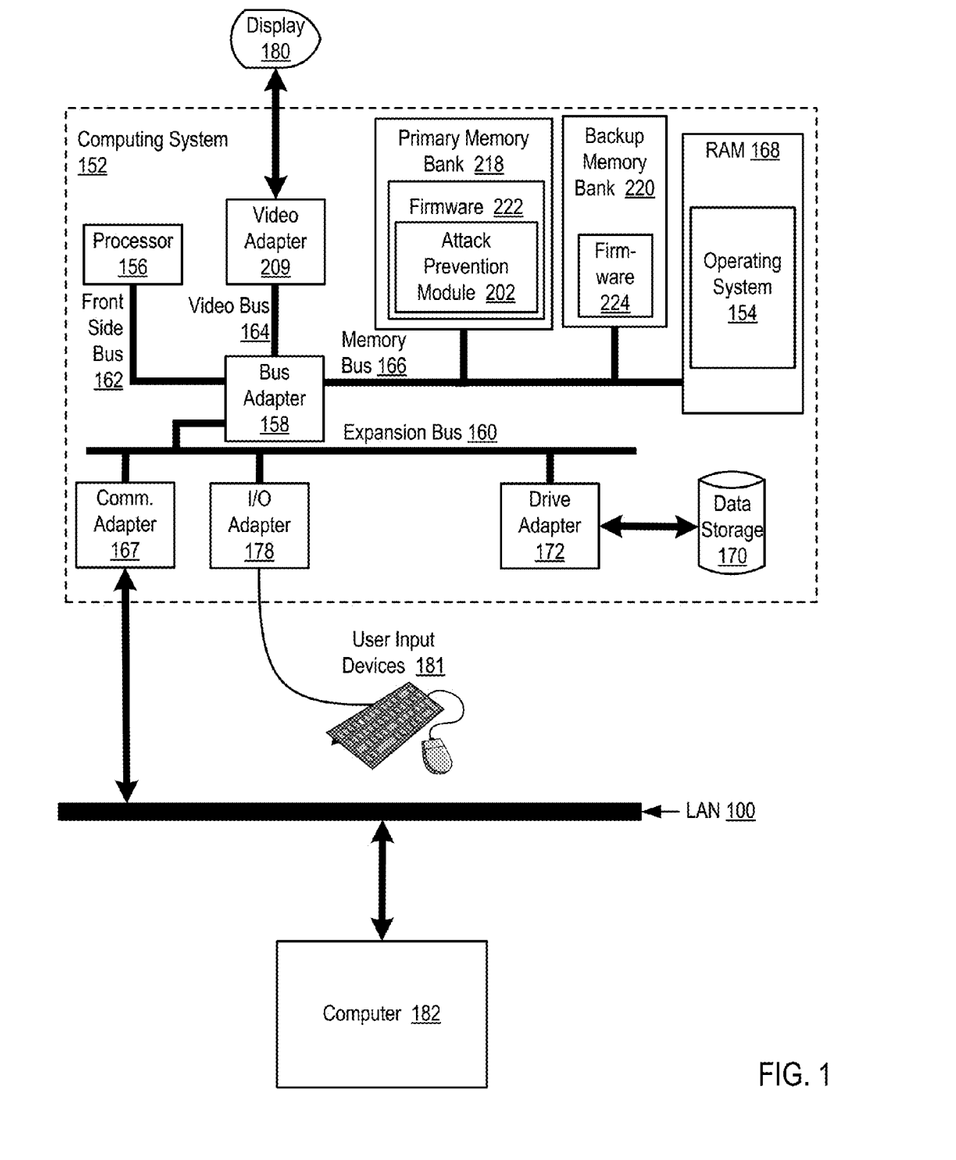
FIG. 1 sets forth a block diagram of automated computing machinery comprising an example computing system useful in preventing a rollback attack according to embodiments of the present invention.

Example methods, apparatuses, and products for preventing a rollback attack in a computing system that includes a primary memory bank and a backup memory bank in accordance with the present invention are described with reference to the accompanying drawings, beginning with FIG. 1. FIG. 1 sets forth a block diagram of automated computing machinery comprising an example computing system (152) useful in preventing a rollback attack according to embodiments of the present invention. The computing system (152) of FIG. 1 includes a primary memory bank (218) and a backup memory bank (220). The primary memory bank (218) and a backup memory bank (220) may be embodied as computer memory such as, for example, flash memory, Read-only memory ('ROM'), Electrically Erasable Programmable Read-Only Memory ('EEPROM'), Non-volatile random-access memory ('NVRAM'), or other form of computer memory.

In the example of FIG. 1, each memory bank (218, 220) includes firmware (222, 224). The primary memory bank (218) is designated as being 'primary' because the primary memory bank (218) includes firmware (222) that is normally used by the computing system (152) during normal operations. The backup memory bank (220) is designated as being 'backup' because the backup memory bank (220) includes firmware (224) that is not normally used by the computing system (152) during normal operations. In such an example, the firmware (224) of the backup memory bank (220) may be utilized, for example, when firmware (222) in the primary memory bank (218) is being updated, when the primary memory bank (218) is malfunctioning, and so on.

Stored in the firmware (222) of the primary memory bank (218) is an attack prevention module (202), a module of computer program instructions improved for preventing a rollback attack in a computing system that includes a primary memory bank and a backup memory bank according to embodiments of the present invention. A rollback attack, as the term is used here, represents a form of attack directed to a computing system (152) in which the version of firmware utilized by the computing system (152) is 'rolled back' to a previous version such that security holes in the previous version of the firmware may be exploited.

The attack prevention module (202) of FIG. 1 may be configured to prevent a rollback attack by determining, during startup of the computing system (152), whether the computing system (152) is attempting to use firmware (224) in the backup memory bank (220). In the example of FIG. 1, a system management module such as an integrated management module ('IMM') may detect which memory bank (218, 220) is to be used for loading firmware (222, 224) stored in the memory banks (218, 220). The system management module may detect which memory bank (218, 220) is to be used for loading firmware (222, 224) stored in the memory banks (218, 220), for example, through a hardware mechanism such as a BIOS recovery jumper or through a software mechanism such that a value representing the memory bank (218, 220) that is to be used for loading firmware (222, 224) is received by the system management module. In such an example, determining whether the computing system (152) is attempting to use firmware (224) in the backup memory bank (220) may be carried out, for example, by the attack prevention module (202) receiving information detected by the system management module that identifies which memory bank (218, 220) is to be used for loading firmware (222, 224) stored in the memory banks (218, 220).

The attack prevention module (202) of FIG. 1 may be further configured to prevent a rollback attack by determining, during startup of the computing system (152), whether the firmware (224) in the backup memory bank (220) is a previous version of firmware (222) in the primary memory bank (218). Determining whether the firmware (224) in the backup memory bank (220) is a previous version of firmware (222) in the primary memory bank (218) is carried out in response to affirmatively determining that the computing system (152) is attempting to use firmware (224) in the backup memory bank (220). Each version of firmware (222, 224) stored in the memory banks (218, 220) may have an associated version number that is used to identify features of the firmware, a release date of the firmware, and so on. As such, a version number for a version of the firmware that is released on a particular release date with a particular set of features may be different than a version number for a different version of the firmware that is released on a different release date with a different set of features. In such an example, determining whether the firmware (224) in the backup memory bank (220) is a previous version of firmware (222) in the primary memory bank (218) may be carried out, for example, by comparing the version number for the firmware (224) in the backup memory bank (220) to the version of firmware (222) in the primary memory bank (218). If the firmware (224) in the backup memory bank (220) is a previous version of firmware (222) in the primary memory bank (218), this means that the firmware (224) in the backup memory bank (220) may include fewer features, more security holes, and less developments than the firmware (222) in the primary memory bank (218).

Readers will appreciate that although the firmware (222) in the primary memory bank (218) is depicted as including attack prevention module (202), the inclusion of the attack prevention module (202) in the firmware (222) in the primary memory bank (218) does not prohibit the firmware (224) in the backup memory bank (220) from being the same version as the firmware (222) in the primary memory bank (218). Stated differently, both the firmware (224) in the backup memory bank (220) and the firmware (222) in the primary memory bank (218) may have the same version number and otherwise include identical features and functionality, with the attack prevention module (202) added as an extension to the firmware (222) in the primary memory bank (218). In some embodiments, the attack prevention module (202) may be added as an extension to the firmware (222) in the primary memory bank (218) by separating the attack prevention module (202) from the firmware (222) in the primary memory bank (218) and executing the code contained in the attack prevention module (202) prior to utilizing the firmware (222) in the primary memory bank (218).

The attack prevention module (202) of FIG. 1 may be further configured to prevent a rollback attack by determining, during startup of the computing system (152), whether a system administrator has authorized the use of the firmware (224) in the backup memory bank (220). In the example of FIG. 1, determining whether a system administrator has authorized the use of the firmware (224) in the backup memory bank (220) may be carried out in response to affirmatively determining that the firmware (224) in the backup memory bank (220) is a previous version of firmware (222) in the primary memory bank (218). In the example of FIG. 1, determining whether a system administrator has authorized the use of the firmware (224) in the backup memory bank (220) may be carried out through the use of secure mechanisms by which a system administrator can consent to the use of firmware (224) in the backup memory bank (220), in spite of the fact that the firmware (224) in the backup memory bank (220) is a previous version of firmware (222) in the primary memory bank (218). The system administrator can be prompted to consent to the use of firmware (224) in the backup memory bank (220), for example, by prompting the system administrator to press a button on a chassis of the computing system (152), thereby indicating that the system administrator is physically proximate to the computing system (152) and further indicating that the firmware (224) in the backup memory bank (220) is not being used in response to a remote attack from a hacker or other malicious entity.

The attack prevention module (202) of FIG. 1 may be further configured to prevent a rollback attack by configuring, during startup of the computing system (152), the computing system (152) to utilize the firmware (224) in the backup memory bank (220). In the example of FIG. 1, configuring the computing system (152) to utilize the firmware (224) in the backup memory bank (220) is carried out in response to affirmatively (214) determining that the system administrator has authorized the use of the firmware (224) in the backup memory bank (220). Configuring the computing system (152) to utilize the firmware (224) in the backup memory bank (220) may be carried out, for example, by providing an identifier associated with a particular memory bank (218, 220) to be used to a system management module such as an IMM. In such an example, the computing system (152) may utilize the firmware (224) in the backup memory bank (220) to initialize the computing system (152) during startup and to control the operation of the computing system (152) after startup. Readers will appreciate that although the attack prevention module (202) is depicted as being separate from the firmware (222) in the primary memory bank (218), the attack prevention module (202) may be part of the firmware (222) in the primary memory bank (218).

The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152). Stored in RAM (168) is an operating system (154). Operating systems useful preventing a rollback attack in a computing system that includes a primary memory bank and a backup memory bank according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers for preventing a rollback attack in a computing system that includes a primary memory bank and a backup memory bank according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computing system (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for preventing a rollback attack in a computing system that includes a primary memory bank and a backup memory bank according to embodiments of the present invention include modems for wired dial-up communications, Ethernet (IEEE 802.3) adapters for wired data communications network communications, and 802.11 adapters for wireless data communications network communications.

Figure 2:
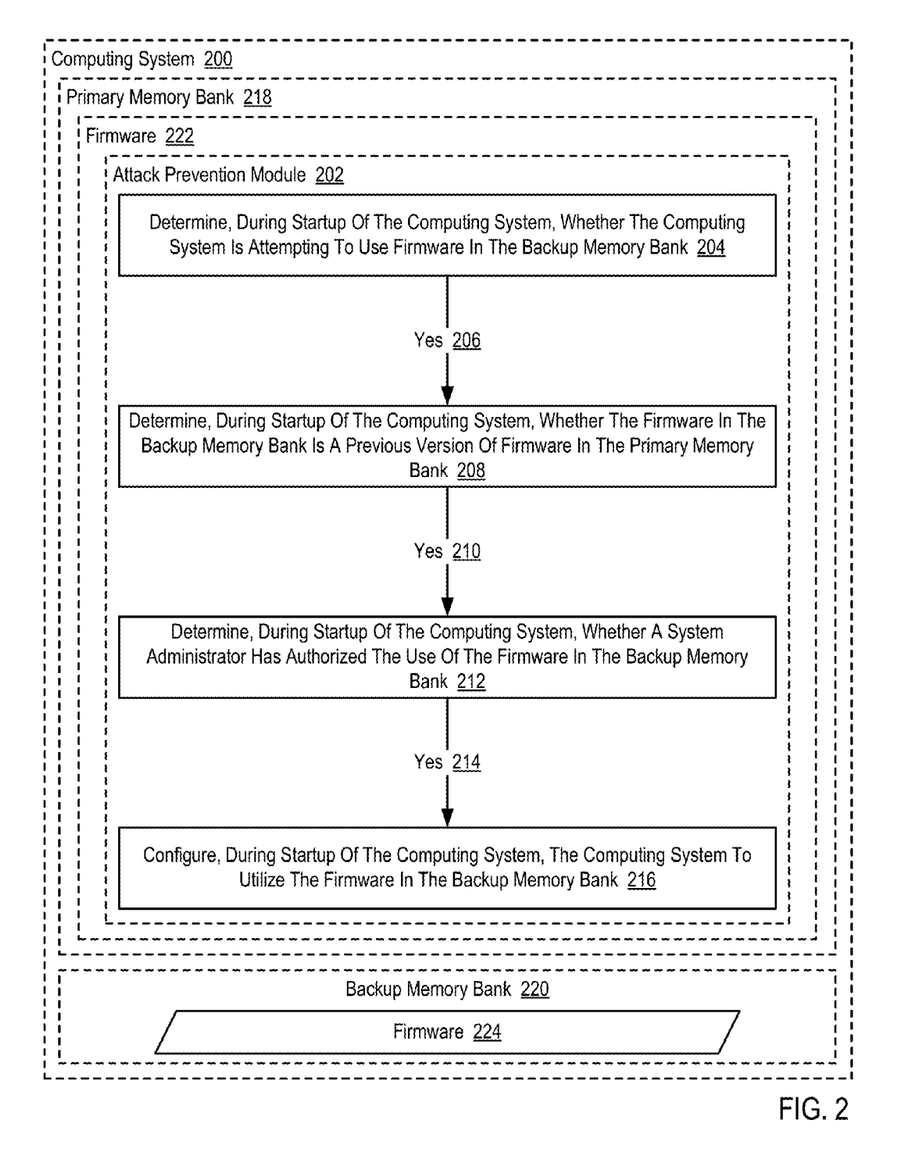
FIG. 2 sets forth a flow chart illustrating an example method for preventing a rollback attack in a computing system that includes a primary memory bank and a backup memory bank according to embodiments of the present invention.

For further explanation, FIG. 2 sets forth a flow chart illustrating an example method for preventing a rollback attack in a computing system (200) that includes a primary memory bank (218) and a backup memory bank (220) according to embodiments of the present invention. A rollback attack, as the term is used here, represents a form of attack directed to a computing system (200) in which the version of firmware utilized by the computing system (200) is 'rolled back' to a previous version such that security holes in the previous version of the firmware may be exploited. In the example method of FIG. 2, a rollback attack is prevented in a computing system (200) that includes a primary memory bank (218) and a backup memory bank (220). The primary memory bank (218) and a backup memory bank (220) may be embodied as computer memory such as, for example, flash memory, ROM, EEPROM, NVRAM, or other form of computer memory.

In the example method of FIG. 2, each memory bank (218, 220) includes firmware (222, 224). The primary memory bank (218) is designated as being 'primary' because the primary memory bank (218) includes firmware (222) that is normally used by the computing system (200) during normal operations. The backup memory bank (220) is designated as being 'backup' because the backup memory bank (220) includes firmware (224) that is not normally used by the computing system (200) during normal operations. In such an example, the firmware (224) of the backup memory bank (220) may be utilized, for example, when firmware (222) in the primary memory bank (218) is being updated, when the primary memory bank (218) is malfunctioning, and so on.

The example method of FIG. 2 is carried out, at least in part, by an attack prevention module (202). The attack prevention module (202) of FIG. 2 may be embodied, for example, as a module of computer program instructions executing on computer hardware such as a computer processor, as a module of computer program instructions executing on virtualized computer hardware such as a virtual machine, and so on. The attack prevention module (202) of FIG. 2 is depicted as being part of the firmware (222) in the primary memory bank (218), although in alternative embodiments the attack prevention module (202) may be separate from the firmware (222) in the primary memory bank (218), but as shown above.

The attack prevention module (202) of FIG. 2 may carry out the example method depicted in FIG. 2 during startup of the computing system (200). In the example method of FIG. 2, startup of the computing system (200) is the process of starting a computing system (200), specifically in regards to starting its software. Startup of the computing system (200) can involve a chain of stages in which at each stage a smaller simpler program loads and then executes a larger more complicated program of the next stage. Startup of the computing system (200) can include a chain of events that begin with the execution of hardware-based procedures and may then hand-off to firmware and software which is loaded into main memory. Startup of the computing system (200) can also involve processes such as performing self-tests, loading configuration settings, loading a BIOS, resident monitors, a hypervisor, an operating system, or utility software. In the example method of FIG. 2, startup of the computing system (200) is distinguished from normal operations of the computing system (200) that occur once the computing system (200) has been started up or booted. As such, readers will appreciate that the example method of FIG. 2 does not dynamically switch between a primary memory bank (218) and a backup memory bank (220) without restarting the computing system (200).

The example method of FIG. 2 includes determining (204), by the attack prevention module (202) during startup of the computing system (200), whether the computing system (200) is attempting to use firmware (224) in the backup memory bank (220). In the example method of FIG. 2, a system management module such as an IMM may detect which memory bank (218, 220) is to be used for loading firmware (222, 224) stored in the memory banks (218, 220). The system management module may detect which memory bank (218, 220) is to be used for loading firmware (222, 224) stored in the memory banks (218, 220), for example, through a hardware mechanism such as a BIOS recovery jumper or through a software mechanism such that a value representing the memory bank (218, 220) that is to be used for loading firmware (222, 224) is received by the system management module. In such an example, determining (204) whether the computing system (200) is attempting to use firmware (224) in the backup memory bank (220) may be carried out, for example, by the attack prevention module (202) receiving information detected by the system management module that identifies which memory bank (218, 220) is to be used for loading firmware (222, 224) stored in the memory banks (218, 220).

The example method of FIG. 2 also includes determining (208), by the attack prevention module (202) during startup of the computing system (200), whether the firmware (224) in the backup memory bank (220) is a previous version of firmware (222) in the primary memory bank (218). In the example method of FIG. 2, determining (208) whether the firmware (224) in the backup memory bank (220) is a previous version of firmware (222) in the primary memory bank (218) is carried out in response to affirmatively (206) determining that the computing system (200) is attempting to use firmware (224) in the backup memory bank (220). Each version of firmware (222, 224) stored in the memory banks (218, 220) may have an associated version number that is used to identify features of the firmware, a release date of the firmware, and so on. As such, a version number for a version of the firmware that is released on a particular release date with a particular set of features may be different than a version number for a different version of the firmware that is released on a different release date with a different set of features. In such an example, determining (208) whether the firmware (224) in the backup memory bank (220) is a previous version of firmware (222) in the primary memory bank (218) may be carried out, for example, by comparing the version number for the firmware (224) in the backup memory bank (220) to the version of firmware (222) in the primary memory bank (218). If the firmware (224) in the backup memory bank (220) is a previous version of firmware (222) in the primary memory bank (218), this means that the firmware (224) in the backup memory bank (220) may include fewer features, more security holes, and less developments than the firmware (222) in the primary memory bank (218).

The example method of FIG. 2 also includes determining (212), by the attack prevention module (202) during startup of the computing system (200), whether a system administrator has authorized the use of the firmware (224) in the backup memory bank (220). In the example method of FIG. 2, determining (212) whether a system administrator has authorized the use of the firmware (224) in the backup memory bank (220) may be carried out in response to affirmatively (210) determining that the firmware (224) in the backup memory bank (220) is a previous version of firmware (222) in the primary memory bank (218). In the example method of FIG. 2, determining (212) whether a system administrator has authorized the use of the firmware (224) in the backup memory bank (220) may be carried out through the use of secure mechanisms by which a system administrator can consent to the use of firmware (224) in the backup memory bank (220), in spite of the fact that the firmware (224) in the backup memory bank (220) is a previous version of firmware (222) in the primary memory bank (218). The system administrator can be prompted to consent to the use of firmware (224) in the backup memory bank (220), for example, by prompting the system administrator to press a button on a chassis of the computing system (200), thereby indicating that the system administrator is physically proximate to the computing system (200) and further indicating that the firmware (224) in the backup memory bank (220) is not being used in response to a remote attack from a hacker or other malicious entity.

The example method of FIG. 2 also includes configuring (216), by the attack prevention module (202) during startup of the computing system (200), the computing system (200) to utilize the firmware (224) in the backup memory bank (220). In the example method of FIG. 2, configuring (216) the computing system (200) to utilize the firmware (224) in the backup memory bank (220) is carried out in response to affirmatively (214) determining that the system administrator has authorized the use of the firmware (224) in the backup memory bank (220). Configuring (216) the computing system (200) to utilize the firmware (224) in the backup memory bank (220) may be carried out, for example, by providing an identifier associated with the backup memory bank (220) to be used to a system management module such as an IMM. In such an example, the computing system (200) may utilize the firmware (224) in the backup memory bank (220) to initialize the computing system (200) during startup and to control the operation of the computing system (200) after startup.

Figure 3:
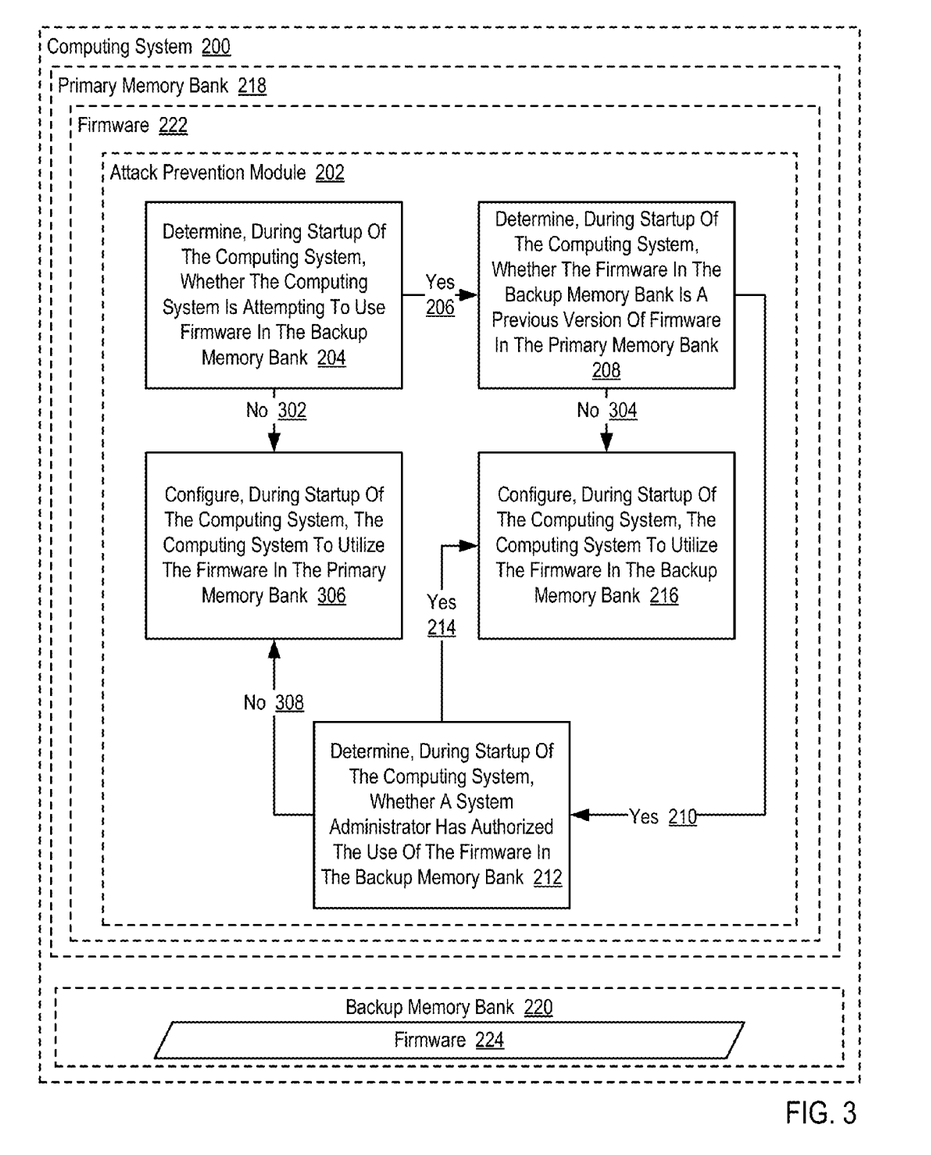
FIG. 3 sets forth a flow chart illustrating an additional example method for preventing a rollback attack in a computing system that includes a primary memory bank and a backup memory bank according to embodiments of the present invention.

For further explanation, FIG. 3 sets forth a flow chart illustrating an additional example method for preventing a rollback attack in a computing system (200) that includes a primary memory bank (218) and a backup memory bank (220) according to embodiments of the present invention. The example method depicted in FIG. 3 is similar to the example method depicted in FIG. 2, as it also includes determining (204) whether the computing system (200) is attempting to use firmware (224) in the backup memory bank (220), determining (208) whether the firmware (224) in the backup memory bank (220) is a previous version of firmware (222) in the primary memory bank (218), determining (212) whether a system administrator has authorized the use of the firmware (224) in the backup memory bank (220), and configuring (216) the computing system (200) to utilize the firmware (224) in the backup memory bank (220). In the example method of FIG. 3, the attack prevention module (202) is stored in the primary memory bank (218) although readers will appreciate that in other embodiments the attack prevention module (202) may be stored in other computer memory of the computing system (200) such as RAM, a hard disk, and so on.

The example method of FIG. 3 also includes configuring (306), by the attack prevention module (202), the computing system (200) to utilize the firmware (222) in the primary memory bank (218). In the example method of FIG. 3, configuring (306) the computing system (200) to utilize the firmware (222) in the primary memory bank (218) may be carried out, for example, by providing an identifier associated with a primary memory bank (220) to be used to a system management module such as an IMM. In such an example, the computing system (200) may utilize the firmware (222) in the primary memory bank (218) to initialize the computing system (200) during startup and to control the operation of the computing system (200) after startup.

In the example method of FIG. 3, configuring (306) the computing system (200) to utilize the firmware (222) in the primary memory bank (218) may be carried out in response to determining that the computing system (200) is not (302) attempting to use firmware (224) in the backup memory bank (220). In the example method of FIG. 3, given that there is a primary memory bank (218) and a backup memory bank (220), determining that the computing system (200) is not (302) attempting to use firmware (224) in the backup memory bank (220) therefore indicates that the computing system (200) is attempting to use firmware (222) in the primary memory bank (218). In view of the fact that utilizing firmware (222) in the primary memory bank (218) is always permissible, the attack prevention module (202) can configure (306) the computing system (200) to utilize the firmware (222) in the primary memory bank (218).

In the example method of FIG. 3, configuring (306) the computing system (200) to utilize the firmware (222) in the primary memory bank (218) may also be carried out in response to determining that the system administrator has not (308) authorized the use of the firmware (224) in the backup memory bank (220). In the example method of FIG. 3, determining that the system administrator has not (308) authorized the use of the firmware (224) in the backup memory bank (220) can only occur after it has been affirmatively (210) determined that the firmware (224) in the backup memory bank (220) is a previous version of firmware (222) in the primary memory bank (218). As such, rolling back to a previous version of firmware (222) in the primary memory bank (218)—by configuring (216) the computing system (200) to utilize the firmware (224) in the backup memory bank (220)—can only occur with authorization of the system administrator. Determining that the system administrator has not (308) authorized the use of the firmware (224) in the backup memory bank (220) will therefore cause the attack prevention module (202) to configure (306) the computing system (200) to utilize the firmware (222) in the primary memory bank (218).

In the example method of FIG. 3, configuring (216) the computing system (200) to utilize the firmware (224) in the backup memory bank (220) may be carried out in response to determining that the firmware (224) in the backup memory bank (220) is not (308) a previous version of the firmware (222) in the primary memory bank (218). In the example method of FIG. 3, when the firmware (224) in the backup memory bank (220) is not (308) a previous version of the firmware (222) in the primary memory bank (218), there is no risk of a rollback attack by utilizing the firmware (224) in the backup memory bank (220) as the firmware (224) in the backup memory bank (220) is not (308) a previous version of the firmware (222) in the primary memory bank (218). As such, the attack prevention module (202) may safely configure (216) the computing system (200) to utilize the firmware (224) in the backup memory bank (220) without risk of a rollback attack.

Figure 4:
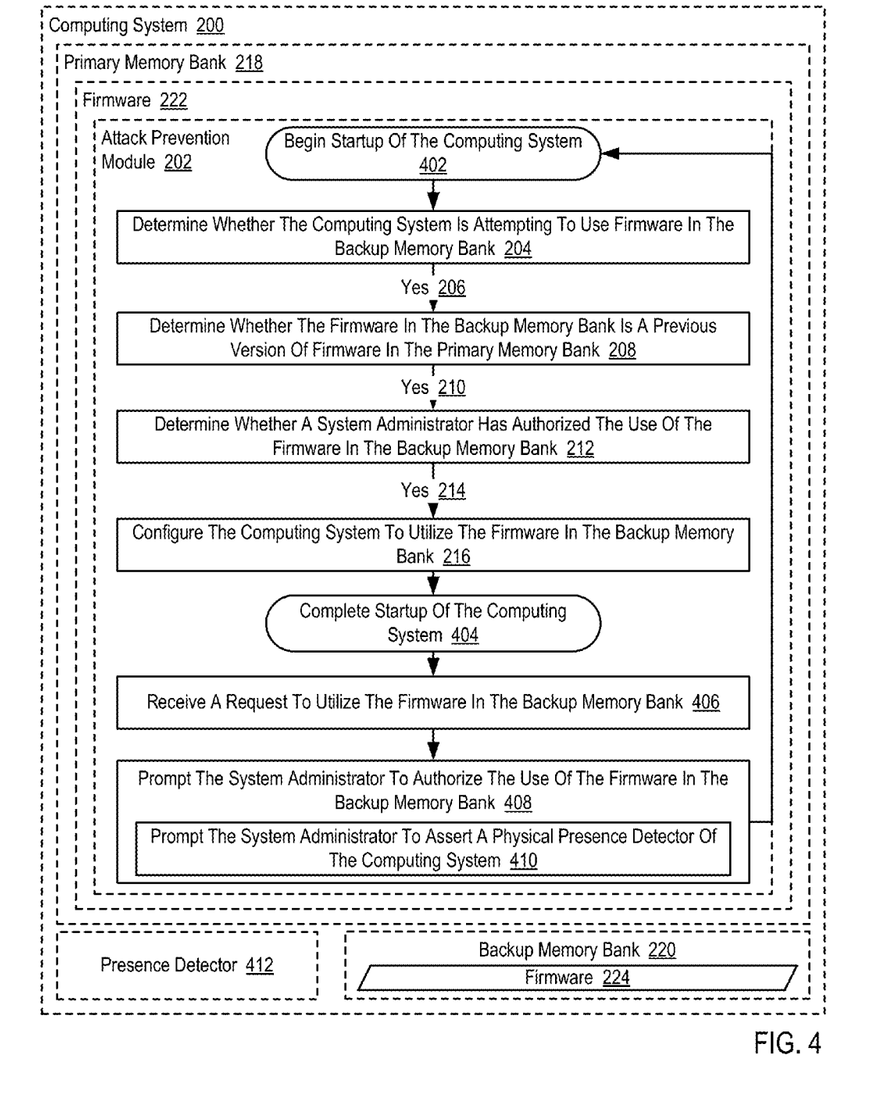
FIG. 4 sets forth a flow chart illustrating an additional example method for preventing a rollback attack in a computing system that includes a primary memory bank and a backup memory bank according to embodiments of the present invention.

For further explanation, FIG. 4 sets forth a flow chart illustrating an additional example method for preventing a rollback attack in a computing system (200) that includes a primary memory bank (218) and a backup memory bank (220) according to embodiments of the present invention. The example method depicted in FIG. 4 is similar to the example method depicted in FIG. 2, as it also includes determining (204) whether the computing system (200) is attempting to use firmware (224) in the backup memory bank (220), determining (208) whether the firmware (224) in the backup memory bank (220) is a previous version of firmware (222) in the primary memory bank (218), determining (212) whether a system administrator has authorized the use of the firmware (224) in the backup memory bank (220), and configuring (216) the computing system (200) to utilize the firmware (224) in the backup memory bank (220).

The steps depicted in FIG. 4 and referenced in the paragraph above each occur after startup of the computing system (200) begins (402) and prior to startup of the computing system (200) completing (404). The remaining steps depicted in FIG. 4 and described below occur after startup of the computing system (200) has completed (404).

The method of FIG. 4 includes receiving (406), by the attack prevention module (202) after startup of the computing system (200), a request to utilize the firmware (224) in the backup memory bank (220). In the example method of FIG. 4, a request to utilize the firmware (224) in the backup memory bank (220) may be embodied as a request to switch the memory bank (218, 220) that is utilized when the computing system (200) is currently utilizing the primary memory bank (218). The request to switch the memory bank (218, 220) that is utilized may be generated, for example, by a system administrator, operating system, system management module, or other component writing a value associated with the backup memory bank (220) to a register that is used to control bank selection. Such a request to utilize the firmware (224) in the backup memory bank (220) may be generated as part of legitimate system operations or may be generated as part of an illegitimate system attack.

The method of FIG. 4 also includes prompting (408), by the attack prevention module (202) after startup of the computing system (200), the system administrator to authorize the use of the firmware (224) in the backup memory bank (220). In the example method of FIG. 4, prompting (408) the system administrator to authorize the use of the firmware (224) in the backup memory bank (220) may be carried out in a variety of ways. For example, the system administrator may be prompted to press a button attached to the computing system (200) to evidence that the system administrator is physically proximate to the computing system (200) and aware of the request, the system administrator may be prompted to press a button attached to the system administrator's personal computer that is coupled for data communications with the computing system (200) to evidence that the system administrator is physically proximate to the system administrator's personal and aware of the request, the system administrator may be prompted to respond to a prompt delivered over a secure pipe between the system administrator's personal computer and the computing system (200) to evidence that the system administrator is aware of the request, and so on. In such a way, reliable and secure authorization must be given by the system administrator authorizes the use of the firmware (224) in the backup memory bank (220). In such an example, once authorization is received, a flag maintained by the computing system (200) may be set to a value indicating that authorization to use the firmware (224) in the backup memory bank (220) has been received.

In the example method of FIG. 4, prompting (408) the system administrator to authorize the use of the firmware (224) in the backup memory bank (220) can include prompting (410) the system administrator to assert a physical presence detector (412) of the computing system (200). The physical presence detector (412) of FIG. 4 may be embodied, for example, as a button on the computing system (200), as a fingerprint scanner, as a transponder reader for reading a transponder given to the system administrator, and so on. The physical presence detector (412) of FIG. 4 represents a mechanism for confirming the physical presence of the system administrator, and is used as a security tool to confirm that the system administrator is aware of the request to utilize the firmware (224) in the backup memory bank (220).

Readers will appreciate that after the system administrator is prompted (408) to authorize the use of the firmware (224) in the backup memory bank (220), startup of the computing system (200) begins (402). In such a way, if the system administrator has authorized the use of the firmware (224) in the backup memory bank (220), the computing system may reboot using the firmware (224) in the backup memory bank (220). If the system administrator has not authorized the use of the firmware (224) in the backup memory bank (220)—indicating the request to utilize the firmware (224) in the backup memory bank (220) was initiated by a malicious program or other entity that is not a system administrator—attempting to reboot computing system using the firmware (224) in the backup memory bank (220) will fail at step 212, and the computing system will be rebooted using the firmware (222) in the primary memory bank (218) as depicted in FIG. 3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:

receiving a request to utilize firmware in a backup memory bank of a computer system;

prompting a system administrator to authorize the use of the firmware in the backup memory bank;

restarting the computer system;

during startup of the computing system and prior to utilizing firmware in a primary memory bank and the firmware in the backup memory bank:

determining whether the computing system is attempting to use firmware in the backup memory bank;

responsive to determining that the computing system is attempting to use firmware in the backup memory bank, determining whether the firmware in the backup memory bank is a previous version of firmware in a primary memory bank;

responsive to determining that the firmware in the backup memory bank is a previous version of firmware in the primary memory bank, determining whether a system administrator has authorized the use of the firmware in the backup memory bank, wherein determining whether the system administrator has authorized the use of the firmware in the backup memory bank comprises determining whether the system administrator provided consent in response to the prompting the system administrator to authorize the use of the firmware in the backup memory bank;

responsive to determining that the system administrator has authorized the use of the firmware in the backup memory bank, configuring the computing system to utilize the firmware in the backup memory bank; and responsive to determining that the system administrator has not authorized the use of the firmware in the backup memory bank, configuring the computing system to utilize the firmware in the primary memory bank.

2. The method of claim 1 further comprising, responsive to determining that the computing system is not attempting to use firmware in the backup memory bank, configuring the computing system to utilize the firmware in the primary memory bank.

3. The method of claim 1 further comprising, responsive to determining that the firmware in the backup memory bank is not a previous version of firmware in the primary memory bank, configuring, by the attack prevention module, the computing system to utilize the firmware in the backup memory bank.

4. The method of claim 1 wherein prompting the system administrator to authorize the use of the firmware in the backup memory bank further comprises prompting the system administrator to assert a physical presence detector of the computing system.

5. An apparatus comprising a computing system, a primary memory bank, a backup memory bank, a computer processor, a computer memory operatively coupled to the computer processor, the computer memory having disposed within it computer program instructions that, when executed by the computer processor, cause the apparatus to carry out the steps of:

receiving a request to utilize firmware in the backup memory bank of the computer system;

prompting a system administrator to authorize the use of the firmware in the backup memory bank;

restarting the computer system;

during startup of the computing system and prior to utilizing firmware in a primary memory bank and the firmware in the backup memory bank:

determining whether the computing system is attempting to use firmware in the backup memory bank;

responsive to determining that the computing system is attempting to use firmware in the backup memory bank, determining whether the firmware in the backup memory bank is a previous version of firmware in a primary memory bank;

responsive to determining that the firmware in the backup memory bank is a previous version of firmware in the primary memory bank, determining whether a system administrator has authorized the use of the firmware in the backup memory bank, wherein determining whether the system administrator has authorized the use of the firmware in the backup memory bank comprises determining whether the system administrator provided consent in response to the prompting the system administrator to authorize the use of the firmware in the backup memory bank;

responsive to determining that the system administrator has authorized the use of the firmware in the backup memory bank, configuring the computing system to utilize the firmware in the backup memory bank; and responsive to determining that the system administrator has not authorized the use of the firmware in the backup memory bank, configuring the computing system to utilize the firmware in the primary memory bank.

6. The apparatus of claim 5 further comprising computer program instructions that, when executed by the computer processor, cause the apparatus to carry out the step of, responsive to determining that the computing system is not attempting to use firmware in the backup memory bank, configuring the computing system to utilize the firmware in the primary memory bank.

7. The apparatus of claim 5 further comprising computer program instructions that, when executed by the computer processor, cause the apparatus to carry out the step of, responsive to determining that the firmware in the backup memory bank is not a previous version of firmware in the primary memory bank, configuring the computing system to utilize the firmware in the backup memory bank.

8. The apparatus of claim 5 wherein prompting the system administrator to authorize the use of the firmware in the backup memory bank further comprises prompting the system administrator to assert a physical presence detector of the computing system.

9. A computer program product including a computer readable storage medium, wherein the computer readable storage medium is not a signal, the computer program product comprising computer program instructions that, when executed, cause a computer to carry out the steps of:

receiving a request to utilize firmware in a backup memory bank of a computer system;

prompting a system administrator to authorize the use of the firmware in the backup memory bank;

restarting the computer system;

during startup of the computing system and prior to utilizing firmware in a primary memory bank and the firmware in the backup memory bank:

determining whether the computing system is attempting to use firmware in the backup memory bank;

responsive to determining that the computing system is attempting to use firmware in the backup memory bank, determining whether the firmware in the backup memory bank is a previous version of firmware in a primary memory bank;

responsive to determining that the firmware in the backup memory bank is a previous version of firmware in the primary memory bank, determining whether a system administrator has authorized the use of the firmware in the backup memory bank, wherein determining whether the system administrator has authorized the use of the firmware in the backup memory bank comprises determining whether the system administrator provided consent in response to the prompting the system administrator to authorize the use of the firmware in the backup memory bank;

responsive to determining that the system administrator has authorized the use of the firmware in the backup memory bank, configuring the computing system to utilize the firmware in the backup memory bank; and     responsive to determining that the system administrator has not authorized the use of the firmware in the backup memory bank, configuring the computing system to utilize the firmware in the primary memory bank.

10. The computer program product of claim 9 further comprising computer program instructions that, when executed, cause the computer to carry out the step of, responsive to determining that the computing system is not attempting to use firmware in the backup memory bank, configuring the computing system to utilize the firmware in the primary memory bank.

11. The computer program product of claim 9 further comprising computer program instructions that, when executed, cause the computer to carry out the step of, responsive to determining that the firmware in the backup memory bank is not a previous version of firmware in the primary memory bank, configuring the computing system to utilize the firmware in the backup memory bank.

12. The computer program product of claim 9 wherein prompting the system administrator to authorize the use of the firmware in the backup memory bank further comprises prompting the system administrator to assert a physical presence detector of the computing system.

13. The method of claim 1 wherein prompting the system administrator to authorize the use of the firmware in the backup memory bank further comprises prompting the system administrator over a secure connection to the computer system.

14. The apparatus of claim 5 wherein prompting the system administrator to authorize the use of the firmware in the backup memory bank further comprises prompting the system administrator over a secure connection to the computer system.

15. The computer program product of claim 9 wherein prompting the system administrator to authorize the use of the firmware in the backup memory bank further comprises prompting the system administrator over a secure connection to the computer system.

\* \* \* \* \*